Patented June 4, 1946

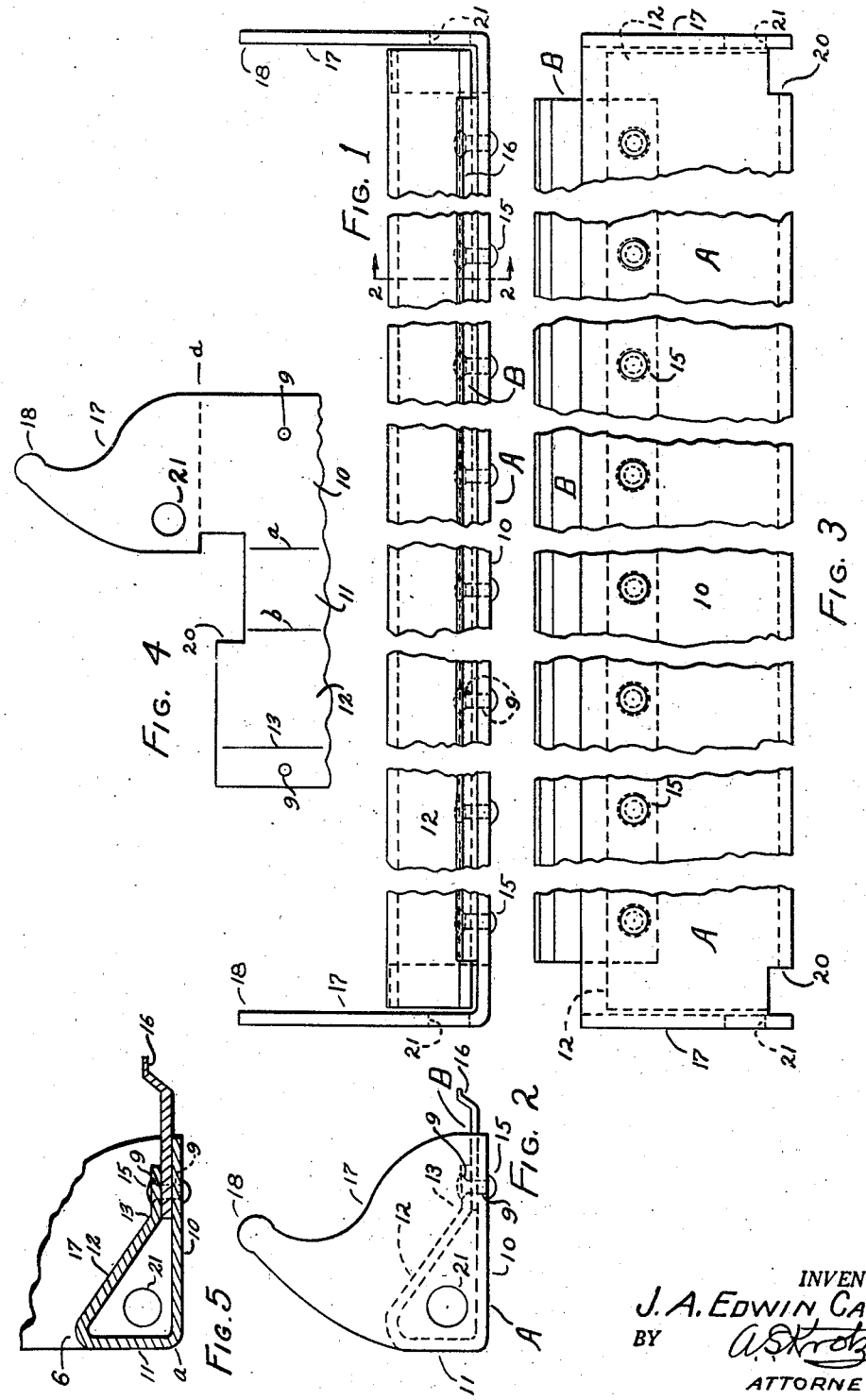

2,401,611

UNITED STATES PATENT OFFICE 2,401,611

CUTTER BAR FOR LAWN MOWERS

J. A. Edwin Carlson, Racine, Wis., assignor to Jacobsen Manufacturing Company, Racine, Wis., a company of Wisconsin Application March 1, 1944, Serial No. 524,817

1 Claim. (Cl. 56—289)

The present invention relates to a complete cutter bar structure including the blade and having convenient means at the end of the structure for securing it to the frame of the mower and for contact with the blade adjusting means.

An object of the present invention is to form a holder for the blade from a single piece of prefabricated flat stock and in a shape which results in great rigidity and strength.

A further object of the present invention is to provide a holder which is hollow and arranged so the blade may be secured between the two edges of the hollow frame and being riveted thereto thus to form in effect a seamless tubular frame which offers great resistance to bending and torsional strains.

An important object of the present invention is to provide a frame and blade which is light, strong, neat in appearance and easily manufactured at low cost.

To these and other useful ends my invention consists of parts and combinations of parts or their equivalents as described and claimed and shown in the accompanying drawing in which:

Fig. 1 is a front view of my complete cutter bar.

Fig. 2 is an end view of the bar as shown in Figure 1.

Fig. 3 is a bottom view of the device as shown in Figure 1.

Fig. 4 is a view of one end of the prefabricated plate from which the blade holder is formed.

Fig. 5 is a sectional view of the body of the cutter bar taken on line 2—2 of Figure 1.

As thus illustrated the frame of my device, as shown in Figures 1, 2 and 3, is designated in its entirety by reference character A. The cutter bar is designated in its entirety by reference character B.

A cross section of member A on lines 2—2 of Figure 1 is shown by dotted lines in Figure 2, thus providing a base portion 10, a rear vertical portion 11 and an upper portion 12. Member 12 is bent as at 13 so a front portion lies parallel to member 10, the front edge stopping short of the front edge of member 10 as shown by dotted line, leaving room between the two surfaces for the insertion therebetween of cutter bar B to the position shown. Member B is securely fastened by means of spaced rivets 15. Thus it will be seen that the horizontal part of member A will be very rigid and because of its shape, a substantial support for cutter bar B is provided; in fact the structure is as rigid as if members 10, 11, 12 and B were integrally formed from a single piece of material so that when the cutting edge of the blade is ground it will retain a definitely permanent and uniform surface for contact with the cutting blades of the reel.

The front edge of member B is bent upwardly and then forwardly as at 16 thus to give rigidity to its overhanging portion and add width to the cutting surface thereof. Member A in its flat state after being prefabricated is illustrated fractionally in Figure 4, wherein it will be noted that portions are cut away as at 20 and that apertures 21 are provided.

The upwardly extending ends 17 of member A are formed at right angles to member 10 as illustrated in Figures 1 and 2, the position of the bends being shown by dotted line $d$ in Figure 4. It will be noted by scrutinizing Figures 3 and 4 that the material is cut away at both ends as at 20, and that I provide apertures 21 in members 17, so that when these members are in the positions shown in Figures 1, 2 and 3, members 17 may be attached to the end members of the mower frame by means of sleeves and bolts (not shown), which extend through apertures 21.

Members 17 extend upwardly a considerable distance and are shaped preferably as shown, their ends 18 being adapted to be engaged by a screwthreaded means (not shown) with which to adjust the blades.

Apertures 9 and 21 may be formed in the prefabricated flat piece as shown in Figure 4; or either of these apertures may be jig-drilled after the frame is formed. Lines $a$, $b$ and 13 in Figure 4 represent substantially the points at which the material is bent, as indicated by these numerals in Figure 5.

I prefer however, to jig-drill the apertures in member B separately and after this member has been formed. Clearly the position of cut-away portions 20 may be changed somewhat from the position shown in Figure 4, the only object of this cut-away portion being to provide an opening for the insertion of the nut used on the bolt previously referred to.

Having thus shown and described my invention, I claim:

A cutter bar for lawnmowers of the class described comprising: a prefabricated flat sheet of metal having narrow end extensions positioned at the front thereof, cut-away portions in said sheet adjacent the rear of said extensions, said extensions being bent upwardly at right angles to the sheet, apertures formed in the said extensions adjacent the lower rear corners thereof, said sheet being bent upwardly substantially on a plane with the rear edge of said extensions and being again bent forwardly and downwardly with a narrow portion of the front edge thereof lying adjacent and parallel to the portion of the sheet between said extensions, a cutter blade, the rear edge of which lies between said parallel members and being secured thereto by spaced rivets.

J. A. EDWIN CARLSON.